April 28, 1931. H. S. HOLMES 1,802,817
WELDING MACHINE
Filed Sept. 7, 1928 6 Sheets-Sheet 1

Inventor
HENRY S. HOLMES.
By His Attorney

April 28, 1931. H. S. HOLMES 1,802,817
WELDING MACHINE
Filed Sept. 7, 1928 6 Sheets-Sheet 3

Inventor
HENRY S. HOLMES.
By His Attorney

April 28, 1931. H. S. HOLMES 1,802,817
WELDING MACHINE
Filed Sept. 7, 1928 6 Sheets-Sheet 4
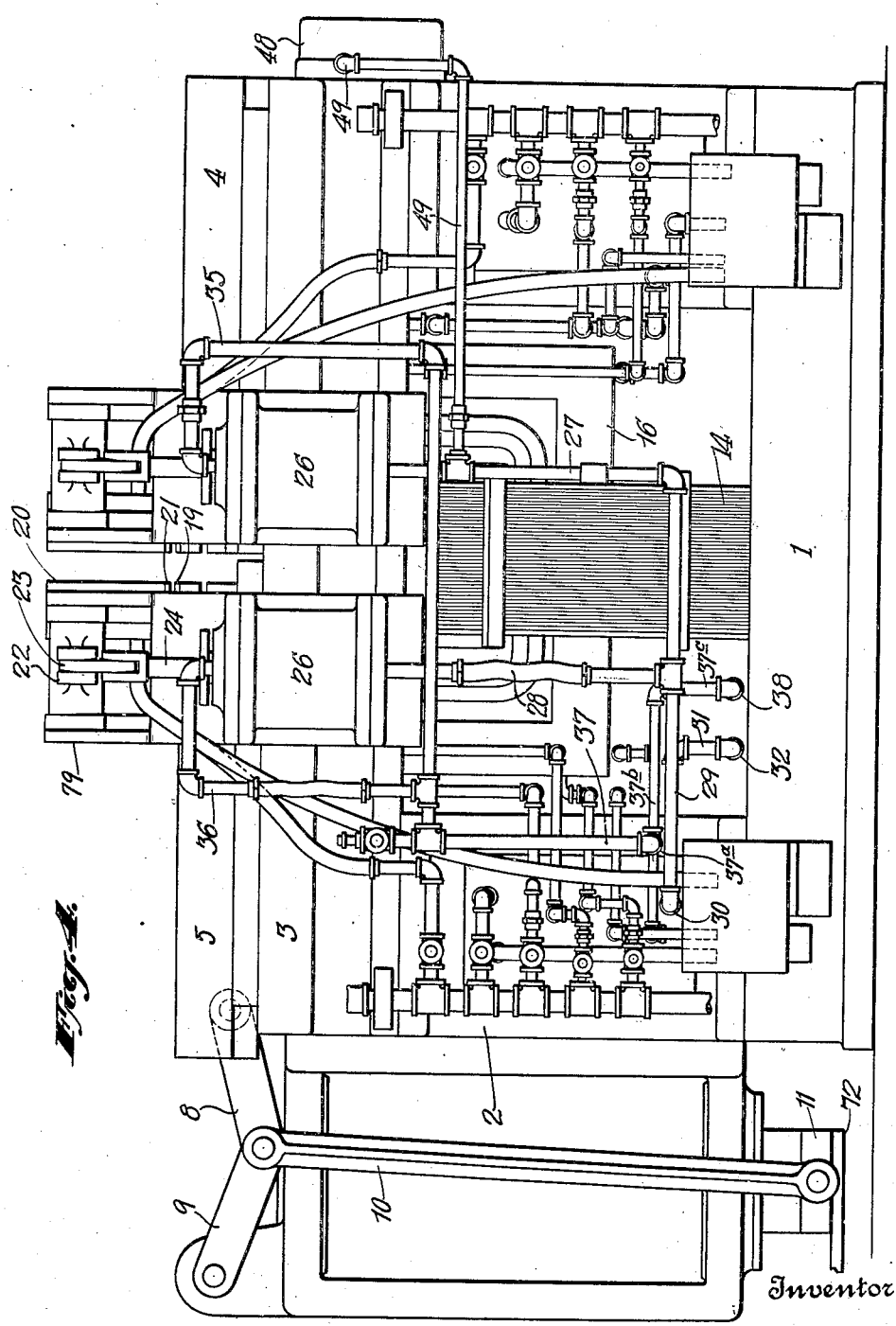
Inventor
HENRY S. HOLMES.
By His Attorney
L. Anthony Usina

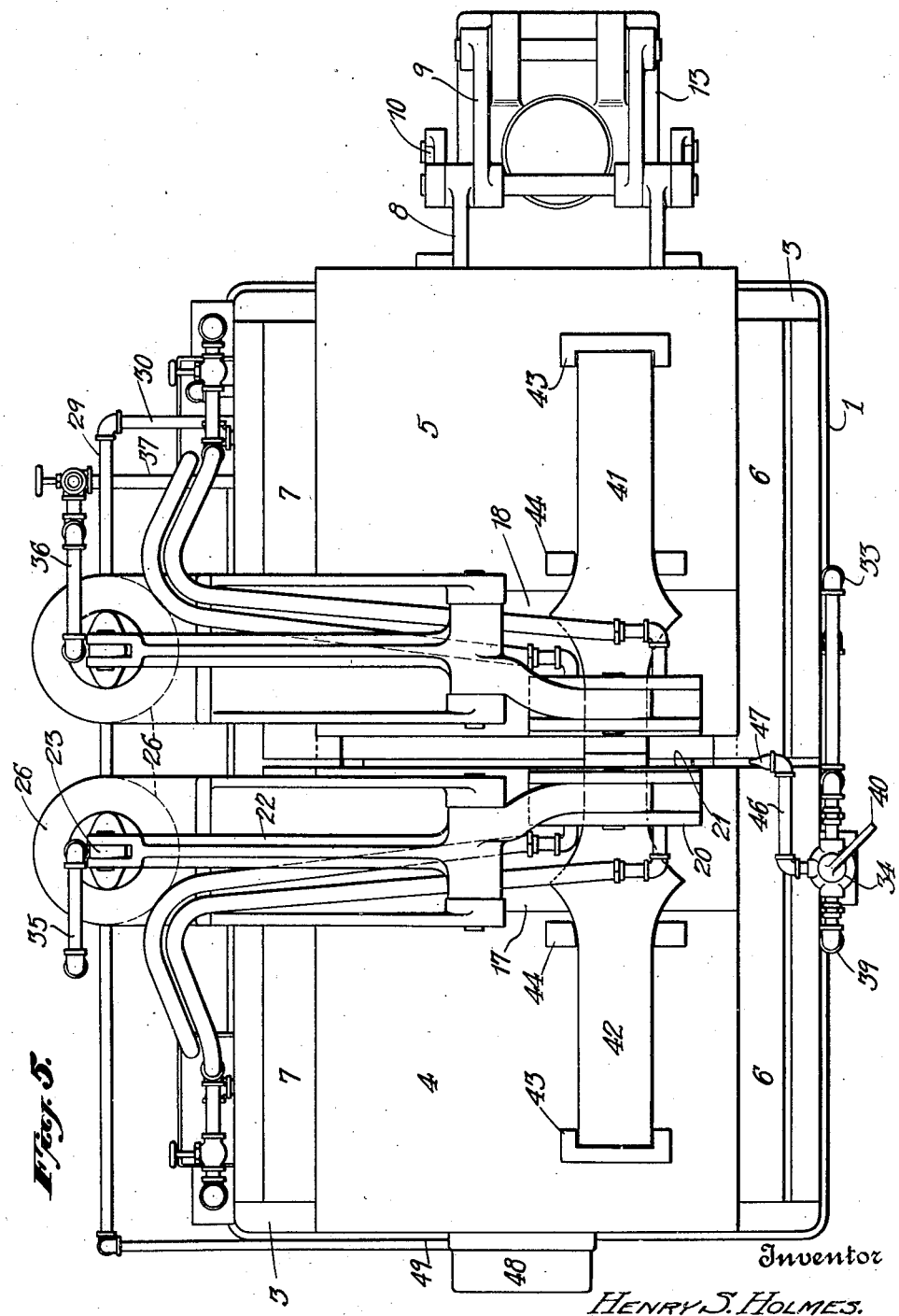

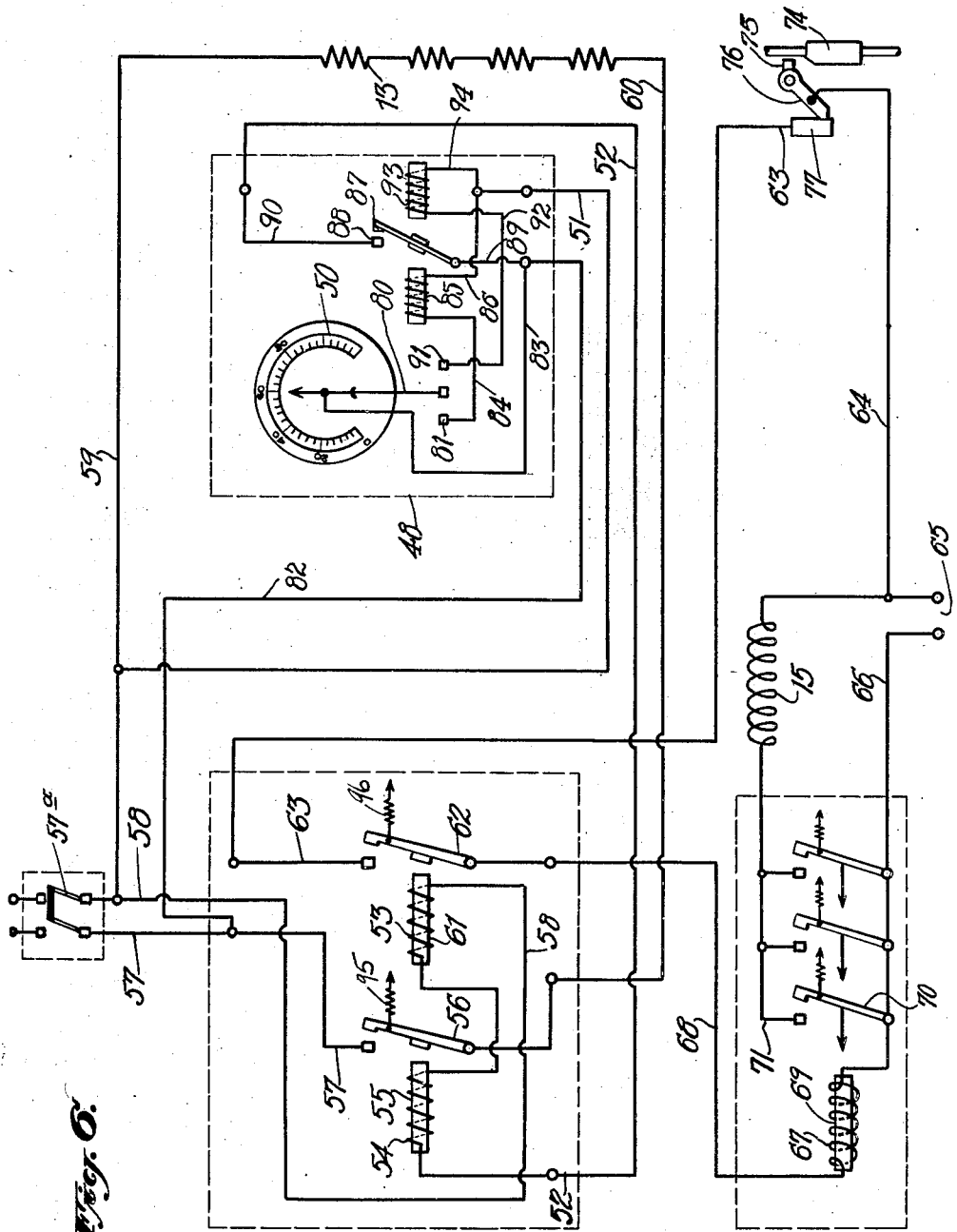

Patented Apr. 28, 1931

1,802,817

UNITED STATES PATENT OFFICE

HENRY S. HOLMES, OF NEW YORK, N. Y., ASSIGNOR, BY MESNE ASSIGNMENTS, TO METROPOLITAN ENGINEERING COMPANY, A CORPORATION OF NEW YORK

WELDING MACHINE

Application filed September 7, 1928. Serial No. 304,412.

My invention aims to provide an improved electric resistance butt-welding machine. It is particularly useful in butt-welding edges of pieces of sheets or plates.

The accompanying drawings illustrate embodiments of the invention.

Fig. 4 is a rear elevation;

Fig. 5 is a plan;

Fig. 6 is a diagram of the electrical connections and controls.

On the base 1 of the machine are mounted columns 2 which support a cross-beam 3 which has an opening in the centre to permit connections from the electrodes to the secondary of the transformer.

On top of the cross-beam and insulated therefrom are fastened a stationary table 4 for holding one work-piece and a similar sliding table 5 for the other work-piece.

Figure 2:
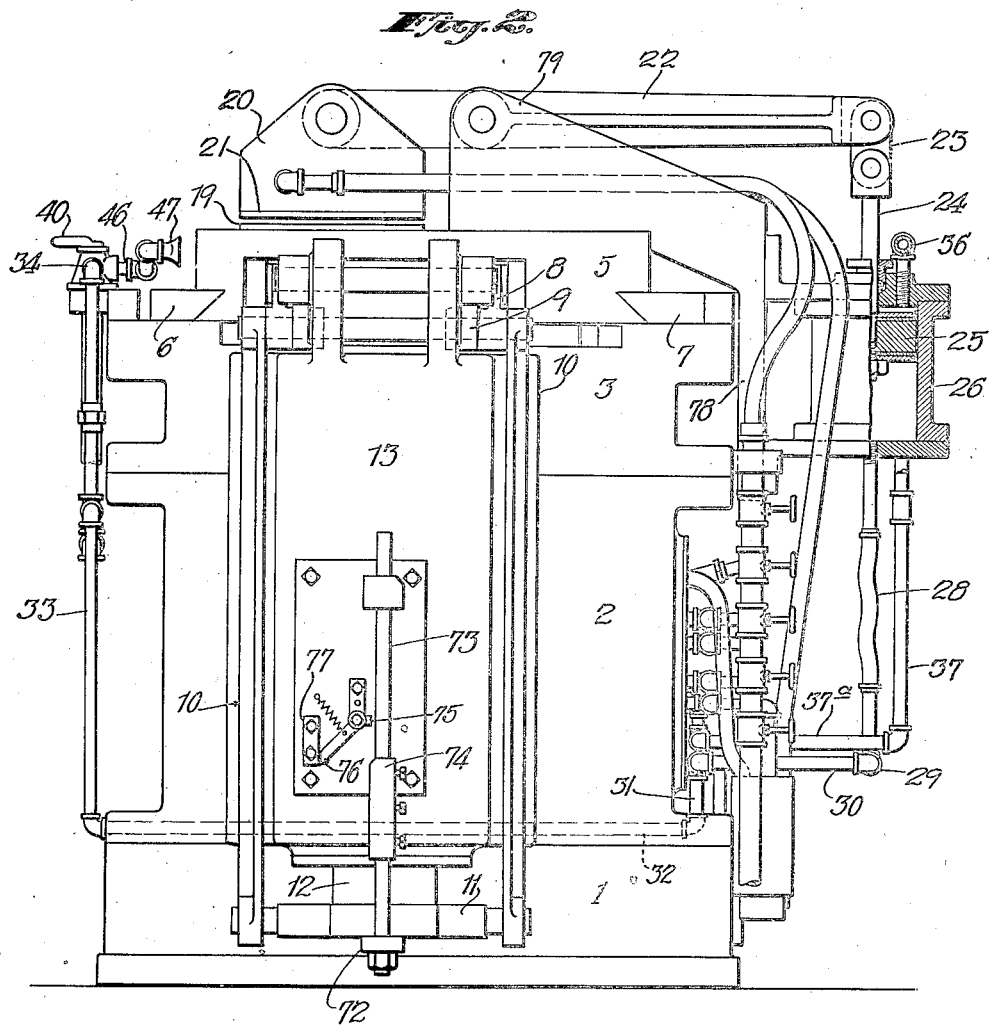
Fig. 2 is a right-hand end elevation partly in section.
Figure 3:
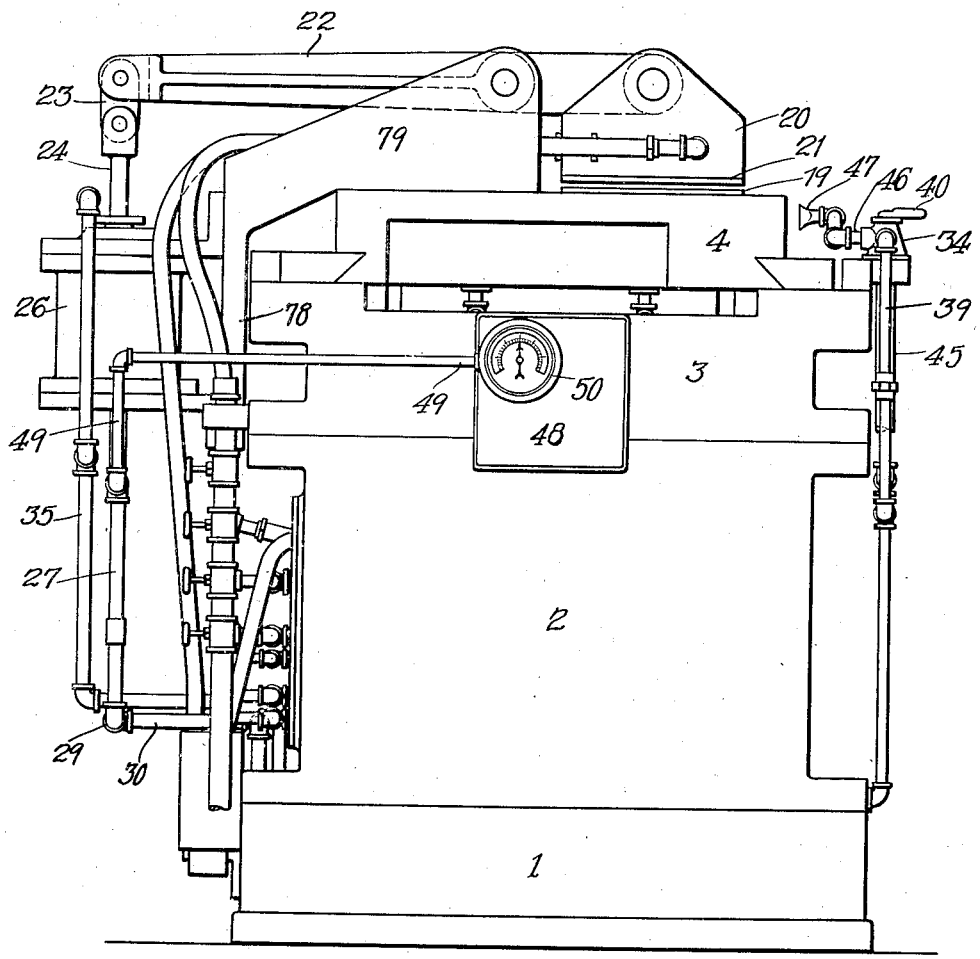
Fig. 3 is a left-hand end elevation.

The sliding table 5 is held in position between gibs 6 and 7 (Fig. 2). It is actuated by means of two pairs of toggle links 8 and 9 connected at their pivotal point to links 10 which are connected at their lower end to a cross-head 11 on the lower end of the plunger 12 of a solenoid 13. When the solenoid is energized the plunger 12 is drawn upward to straighten the toggle and force the table 5 forward. When the solenoid 13 is de-energized the weight of the parts retracts the table.

The transformer is of the usual type consisting of an iron core 14 around which is wound the primary coil 15 and the secondary 16. The latter is connected by any usual or suitable switch blades or other connectors to electrode blocks 17 and 18 carried by the tables 4 and 5 respectively.

On each of these electrode blocks is a renewable copper plate 19. The work-pieces are clamped onto the electrode plates 19 with their edges approximately in contact. Thereupon the table 5 is advanced and the welding current is passed until a certain take-up of metal is effected, whereupon the welding current is broken and the upper clamp lifted to permit removal of the finished work by pulling it forward, and the table 5 withdrawn.

The clamping arrangement is the same for both workpieces. It comprises a swivel head 20 to the bottom of which is fastened a renewable copper plate 21, corresponding in location to the plate 19. The head is connected by a lever 22 and link 23 to a piston rod 24 actuated by a piston 25 in a cylinder 26, the piston being actuated by air or other fluid under pressure.

From the bottoms of the two cylinders 26 there are pipes 27 and 28 (Fig. 4) leading by a pipe 29 at the back and a bent pipe 30, 31, 32 (Fig. 2) to a pipe 33 at the front which communicates with one side of a valve 34 conveniently accessible to the operator. From the upper ends of the cylinders pipes 35 and 36 lead downward at the back to a common pipe 37 which through bent piping 37ª, 37ᵇ and 37ᶜ, Fig. 4, connects with a pipe 38 passing along the right-hand side and upward through pipes 39 to the opposite end of the two-way valve 34. When the handle 40 of the valve is in the right-hand position, Fig. 1, the air is allowed to flow into the bottom of the cylinders, and vice versa.

The work-pieces 41 and 42 are identical in this case, though they may be different. Gauges or stops 43 and 44 at the ends and sides project up from the tables 4 and 5 and serve to hold the work-pieces in position on such tables.

Assuming the pistons are at the bottom of the air cylinders and that the clamping heads 20 are lifted, the work-pieces are set in place and the operator moves the valve handle 40 to the right. Air enters from the supply pipe 45 (Fig. 1) and passes into the bottoms of the cylinders 26, raising the pistons and pressing the clamping heads 20 down to clamp the work-pieces. The operation of this valve starts a series of operations which complete the welding; after which the turning of the valve in the opposite direction releases the clamps so as to allow withdrawal of the work and restores the parts of the apparatus to the starting position. The operator does not have to actuate the switches or other devices. These are all actuated under control of the air valve.

From the valve 34 an exhaust pipe 46 leads to a nozzle 47 which blows the air along the line of the weld just below the work and helps to cool the latter and the adjacent parts of the machine. When the valve handle is turned to the right it admits air pressure from the main 45 to the bottoms of the cylinders as explained, and the air from the tops of the cylinders is blown out through the nozzle 36. When the handle is turned to the left, the air from the pressure main 45 passes to the tops of the cylinders, to open the clamps, and the air from the bottoms is blown out through the nozzle 47. Various common valve designs may be used for this purpose.

The pressure governor 48 is mounted on the left-hand side of the machine and is actuated through a pipe 49 leading from a point in the pipe 27 which supplies air to the underside of one of the air cylinders when the clamps are operated. Such pressure governors are standard apparatus and may be of different designs, the details not being illustrated herein. It is designed to complete certain circuits when the pressure rises to a certain point indicated on the dial 50, and to break such circuits when the pressure falls. The diagram, Fig. 6, illustrates the circuits and the control thereof by the air pressure.

When the air pressure reaches a certain amount, say eighty pounds of air for the case illustrated, the contact 80 on one end of the pressure gauge indicating needle touches the contact 81. This allows current to flow from one pole of the switch 57$^a$ through the line 57, 82, 83, 84, coil 85, and line 86 and 51 to the opposite pole of switch 57$^a$. Coil 85, thus energized, closes contacts 87, 88 which allows current to flow from one pole of switch 57$^a$ through lines 57, 82, 89, 90, 52, coils 54 and 53, which are connected in series for convenience, and line 58 to the opposite pole of switch 57$^a$. This energizes coils 53 and 54. The coil 54 when energized, exerts, through a core 55, a pull on the spring-retracted switch blade 56 which makes or breaks the connection to a line 57 leading to one terminal of a direct current switch 57$^a$. The return line 58 from this switch has a connection 59 leading to the pressure magnets 13, the opposite end of which is connected by a line 60 to the switch blade 56. Thus the pressure magnets 13 are operated by the direct current and, through the toggle connection, press the work-pieces together.

The energizing of the coil 53 exerts a pull through the core 61 on a spring-retracted switch 62 which connects with a line 63 leading through a trip switch 76, 77 to a branch line 64 from the source of alternating current (at 65). The opposite branch 66 leads to a solenoid or similar coil 67 which has a connection 68 to the switch 62. The core 69 exerts a pull on the three blades 70 of a three-pole switch which serve to close the circuit between the line 66 and a line 71 leading to the primary coil 15 of the transformer which supplies the welding current. The machine illustrated is intended for very heavy currents, beyond those which can be controlled by a single-pole conductor, and it is preferable to use a three-pole arrangement as shown.

Figure 1:
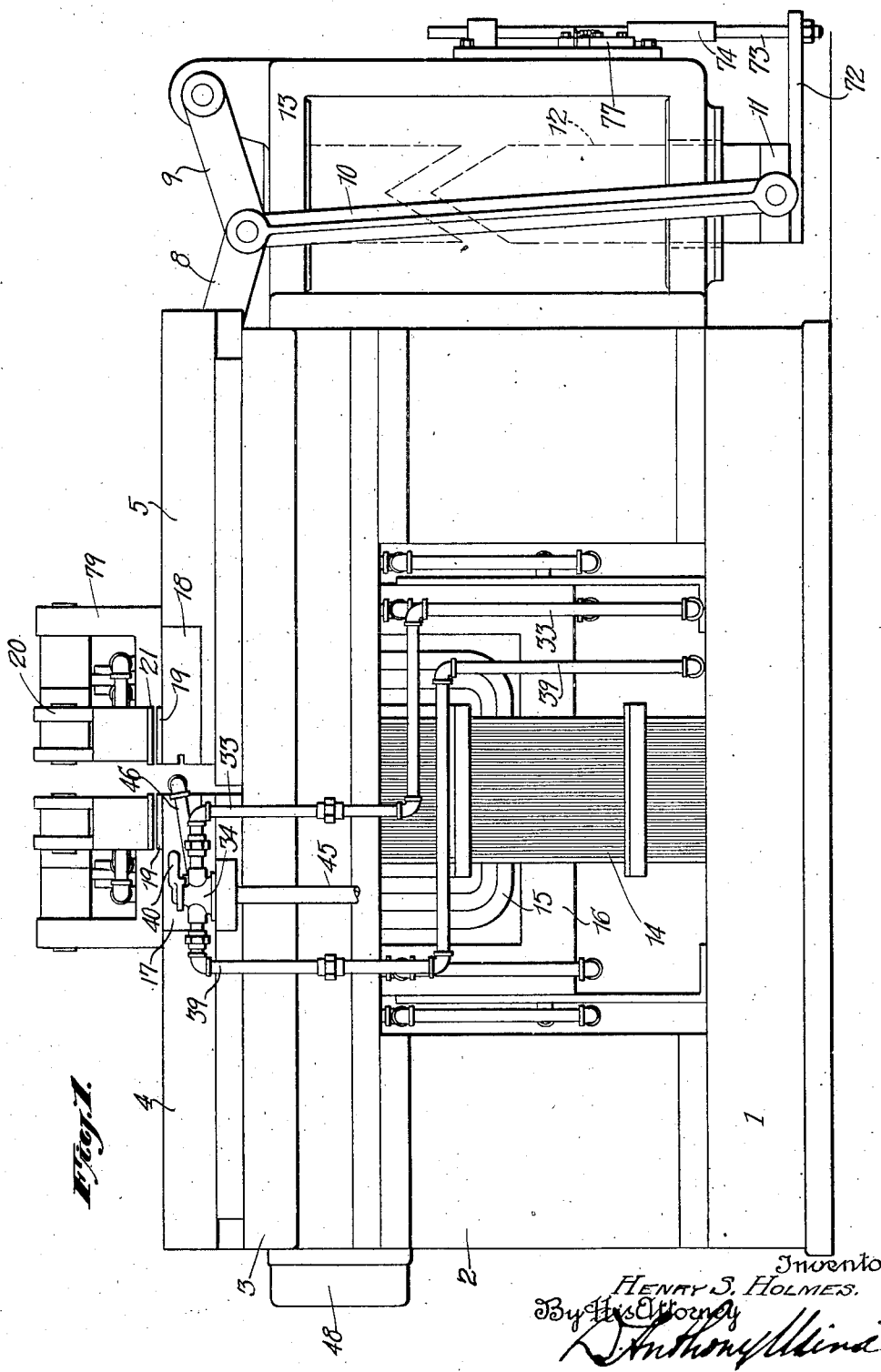
Fig. 1 is a front elevation of a machine for welding the segments of a sheet metal blank for the rear axle housing of an automobile, such as is described, for example, in the Murray application Serial No. 170,177, filed February 23, 1927, and certain other applications and patents.

The trip switch is illustrated in Figs. 1 and 2. The lower cross-head 11 of the pressure magnet 13 has a lateral extension 72 to which is connected the lower end of a weighted rod 73 on which is a tripping block or cam 74 adjustable in height and adapted to strike a projection 75 on a spring-retracted switch blade 76 which normally closes the circuit.

At a given point in the upward movement of the rod, the block will strike the arm 75 and swing the switch blade 76 away from its contact 77 and will hold the break open until the rod is again tripped by the lowering of the plunger of the solenoid 13.

Thus the edges of the work, after clamping, are heated by the alternating current and are pressed together by the pressure magnet through a predetermined distance or take-up. And at the end of this distance the trip switch interrupts the welding current. The pressure continues however, and the operator by delaying the reversing of the air valve may allow the take up pressure to continue until the metal becomes cold or may stop it at any intermediate point.

When the air valve 34 is reversed and the pressure in the bottom of the cylinders falls to a predetermined amount, say forty pounds, then the contact 80 (Fig. 6) touches the contact 91. This allows current to flow from one pole of the switch 57$^a$ through the lines 57, 82, 83, 92, coil 93, lines 94, 51 to the opposite pole of switch 57$^a$. The coil 93, thus energized, opens the contacts 87, 88, which opening de-energizes the coils 53 and 54, thus allowing the switches 56 and 62 to open by means of the springs 95, 96. The opening of the switch 56 cuts off the current from the pressure or take-up magnet. The opening of the switch 62 merely provides a second break in the alternating current circuit, so that when the core of the pressure magnet drops and the trip switch 76 is closed, the circuit will still be open at 62 and ready for the next operation.

The reversal of the air pressure in the cylinders opens the clamps, as previously explained, and leaves the machine ready for the next operation. The pressure governor may be set to open the switches 56 and 62 at any desired air pressure. It may, for example, close these switches at eighty pounds pressure and open them at forty pounds.

The parts of the apparatus which would otherwise be liable to overheating are preferably cooled as usual by water cooling pipes and flexible connections, as illustrated. The clamping cylinders 26 are mounted on downward extensions 78 at the rear of standards 79 which are mounted on top of the tables 4 and 5 and carry the trunnions of the clamping levers 22. The pipe connections to the cylinder of the movable table 5 are partly flexible so as to accommodate them to the short take-up movement of the table and the clamp carried thereby.

It is important that the clamping pressure shall continue as long as there is any welding pressure or take-up. This purpose is effected by the control of the take-up magnets by the air pressure exerted on the clamping apparatus. Even when the clamping pressure falls to forty pounds, and the take-up pressure is relieved, the clamps remain effective though under a pressure which is falling and which permits the retraction of the table 5 by the weight of the solenoid core and connected parts.

It is not essential that the welding current shall be broken or controlled by the predetermined take-up or advance of the work. Various other known or suitable means may be used for breaking the welding circuit at a proper stage of the operation. Likewise other means may be used for actuating the take-up mechanism, using the pneumatic pressure only to release it; or other means may be used for releasing it, using the pneumatic pressure only to initiate its operation.

Various other modifications may be made by those skilled in the art without departing from the invention as defined in the following claims:

1. An electric resistance butt-welding machine comprising relatively movable electrodes, means for clamping work-pieces thereon and separate means dependent on the clamping pressure for automatically exerting a take-up pressure on the electrodes and the work-pieces clamped thereon.

2. An electric resistance butt-welding machine comprising relatively movable electrodes, means for clamping work-pieces thereon, means for exerting a take-up pressure on the electrodes and the work-pieces clamped thereon and means dependent on the clamping pressure for automatically releasing the take-up pressure.

3. An electric resistance butt-welding machine comprising relatively movable electrodes, means for clamping work-pieces thereon, means dependent on the clamping pressure for automatically exerting a take-up pressure and means dependent on the clamping pressure for automatically releasing the take-up pressure.

4. An electric resistance butt-welding machine comprising relatively movable electrodes, means for clamping work-pieces thereon, means dependent on the clamping pressure for automatically establishing the welding current and exerting a take-up pressure and automatic means for releasing the take-up pressure when the clamping pressure has been relieved.

5. An electric resistance butt-welding machine comprising relatively movable electrodes, means for clamping work-pieces thereon, means dependent on the clamping pressure for automatically establishing the welding current and exerting a take-up pressure and automatic means for releasing the take-up pressure when the clamping pressure has been relieved and automatic means for stopping the welding current upon a predetermined take-up of the work.

6. An electric resistance butt-welding machine for welding the edges of sheet metal work-pieces comprising electrode plates adapted to receive and support such work-pieces and stops projecting from said plates for engaging the edges of the work-pieces thereon and properly locating such work-pieces and means for clamping the pieces on the plates in such location.

7. An electric resistance butt-welding machine comprising pneumatic clamping means for the work, solenoid take-up means for pressing the work-pieces together and means for actuating the take-up means under control of the pneumatic clamping pressure.

8. An electric resistance butt-welding machine comprising pneumatic clamping means for the work, solenoid take-up means for pressing the work-pieces together and means for releasing the take-up pressure when the pneumatic clamping pressure is lowered to a determined point.

9. An electric resistance butt-welding machine comprising pneumatic clamping means for the work, solenoid take-up means for pressing the work-pieces together and means for actuating the take-up means when the pneumatic pressure is raised to a determined point and means for releasing the take-up pressure when the pneumatic pressure is lowered to a determined point.

10. An electric resistance butt-welding machine comprising clamping means for the work, pneumatic mechanism for applying pressure to the clamping means, and means for directing the exhaust from said pneumatic mechanism on the work to cool it when the clamping pressure is being relieved.

11. An electric resistance butt-welding machine comprising relatively movable electrode plates, clamping heads for clamping work-pieces on said plates, operating levers for said clamping heads having ends extended beyond the sides of said plates and poweractuated means engaging said ends of the levers.

12. An electric resistance butt-welding machine having means for clamping the work-pieces, means for pressing them together and taking up the excess of metal, means for establishing a welding current through the work-pieces, actuating devices for the several means aforesaid, a fluid-pressure valve and means controlled thereby which automatically causes the actuation of the several devices aforesaid in proper order.

13. An electric resistance butt-welding machine having means for clamping the work-pieces, means for pressing them together and taking up the excess of metal, means for establishing a welding current through the work-pieces, actuating devices for the several means aforesaid, a fluid-pressure valve and means controlled thereby which automatically causes the actuation of the several devices aforesaid in proper order and which, after a determined take-up, automatically causes the cutting off of the welding current.

14. An electric resistance butt-welding machine having means for clamping the work-pieces, means for pressing them together and taking up the excess of metal, means for establishing a welding current through the work-pieces, actuating devices for the several means aforesaid, a fluid-pressure valve and means controlled thereby which automatically causes the actuation of the several devices aforesaid in proper order and which by an opposite movement automatically causes the restoration of the clamping means and the take-up means to their starting positions.

15. An electric resistance butt-welding machine having means for clamping the work-pieces, means for pressing them together and taking up the excess of metal, means for establishing a welding current through the work-pieces, actuating devices for the several means aforesaid, fluid pressure mechanism which when the pressure rises to a determined point causes the actuation of the several devices aforesaid in proper order.

16. An electric resistance butt-welding machine having means for clamping the work-pieces, means for pressing them together and taking up the excess of metal, means for establishing a welding current through the work-pieces, actuating devices for the several means aforesaid, fluid pressure mechanism which when the pressure rises to a determined point causes the actuation of the several devices aforesaid in proper order and which, after a determined take-up, automatically causes the cutting off of the welding current.

17. An electric resistance butt-welding machine having means for clamping the work-pieces, means for pressing them together and taking up the excess of metal, means for establishing a welding current through the work-pieces, actuating devices for the several means aforesaid, fluid pressure mechanism which when the pressure rises to a determined point causes the actuation of the several devices aforesaid in proper order and which when the pressure falls to a determined point causes the restoration of said means to their starting positions.

18. An electric resistance butt-welding machine having means for clamping the work-pieces, means for pressing them together and taking up the excess of metal, means for establishing a welding current through the work-pieces, actuating devices for the several means aforesaid, fluid pressure mechanism which when the pressure falls to a determined point causes the restoration of the clamping means and the take-up means to their starting positions.

19. An electric resistance butt-welding machine comprising electrodes relatively movable longitudinally, transversely movable means for clamping work pieces thereon, and means dependent on the transverse clamping pressure for automatically exerting a longitudinal take-up pressure.

In witness whereof, I have hereunto signed my name.

HENRY S. HOLMES.